M. R. WOLFARD.
COMBUSTION AND THERMODYNAMIC CONVERSION WITHIN ENGINES.
APPLICATION FILED FEB. 17, 1915. RENEWED DEC. 6, 1917.

1,305,579.

Patented June 3, 1919.

WITNESSES
A. T. Palmer
Mary A. Ingham

INVENTOR
MEAL R. WOLFARD
BY
Mitchell Chadwick Kent
ATTYS.

UNITED STATES PATENT OFFICE.

MERL R. WOLFARD, OF CAMBRIDGE, MASSACHUSETTS, ASSIGNOR OF ONE-FOURTH TO LEROY A. AMES, OF SPENCER, MASSACHUSETTS, AND ONE-FOURTH TO EVERETT E. KENT, OF NEWTON, MASSACHUSETTS.

COMBUSTION AND THERMODYNAMIC CONVERSION WITHIN ENGINES.

1,305,579.      Specification of Letters Patent.      Patented June 3, 1919.

Application filed February 17, 1915, Serial No. 8,832. Renewed December 6, 1917. Serial No. 205,892.

*To all whom it may concern:*

Be it known that I, MERL R. WOLFARD, a citizen of the United States, residing at Cambridge, in the county of Middlesex and State of Massachusetts, have invented new and useful Improvements Pertaining to Combustion and Thermodynamic Conversion within Engines, of which the following is a specification.

This invention relates to improvements in processes pertaining to combustion and thermodynamic conversion within an engine. More particularly it relates to processes of converting energy from latent form in liquid fuel into useful kinetic form by combustion of the fuel. It is an object of the invention to provide a process which among other advantages over processes heretofore known, leads to the new and valuable results, that without the excessive weight that has heretofore been necessary a safe, high-efficiency engine can be constructed to operate at very high pressures, such as the pressures under which engines of the Diesel type operate; or a high efficiency engine can be made to operate at lower pressures, such as 350 to 400 pounds, with an efficiency approximating that heretofore attained with Diesel engines; or an engine of low pressure type, with greater efficiency than has heretofore been attained in such engines.

It is also an object of the invention to provide the other advantages which characterize the invention disclosed, among which are a method by which the less volatile and so-called "heavier" hydro-carbon oils can be used successfully as fuel in an engine, such oils being cheaper than the so-called "gas oil" which has hitherto been required for operation under commercial conditions.

One feature of the best form of the invention is that a moving column of pure air or its equivalent is provided in a suitable inclosed space or receptacle such as the cylinder or combustion chamber of an engine, at the head end of which column liquid fuel is introduced, volatilized and burned. The rate of introduction of the fuel may be controlled by any suitable mechanical means, so that it enters gradually as the column is moving; but it is a feature of the invention that the rate of movement of the column is graduated to correspond to the rate of introduction of the fuel, and that this graduated rate of movement is controlled, wholly or in part, by the liberation of heat of combustion at the head end of the column. Such heat sets up a back pressure, so that the column of air which is being compressed and moved forward by the piston advances only at the desired rate. The combustion setting up this back pressure begins during the compression stroke of the engine and continues during the latter part thereof, the earlier part of it making a positive addition of heat and pressure while the addition of pressure by mechanical means is going on. This permits a "high pressure" engine to have a large clearance, with resulting safety in case of abnormal explosion. It permits the clearance of a "low pressure" engine to be smaller than heretofore, with resulting increase of efficiency and of capacity and more perfect combustion. Furthermore, the materials by which this back pressure is generated and by which the heat is liberated, may be stratified, so that, in what I regard as the best form of the process, an interval of time is afforded in which the liquid fuel becomes volatilized, after pervading a section of the column of air, this volatilization being separated from the combustion. However, the combustion occurs very promptly after the volatilization, and combustion is continually in progress while fuel is being introduced, occurring simultaneously with the volatilization of other fuel and with the introduction of still other fuel which will in its turn be first volatilized and then burned. The process of combustion of the whole of each fuel charge is thus gradual, but as soon as the combustion of any particular particle starts it rapidly becomes complete, because of the preliminary thorough mixing of the air and fuel. Other features of the process will appear from the description which follows. It is intended by this patent to cover, by suitable expression in the appended claims, whatever features of patentable novelty exists in the invention disclosed, in so far as the same relate to the process.

The practice of the process is not limited to any particular type of engine, but may be carried out with various mechanisms. In the first of my co-pending applications for patent mentioned below, I show and claim details of a type of mechanism which I have invented and consider best for many purposes for carrying out this process; but it should be observed that that mechanism can be used without performing this process, and that the process can be performed without using that mechanism.

Reference is made to my co-pending applications for patent in which details of mechanism by which the process may be practised are shown and claimed as follows:

Serial No. 8828 for engine;
Serial No. 8829 for combustion chamber;
Serial No. 8830 for fuel injection nozzle;
Serial No. 8831 for multi-cylinder engine.

In the accompanying drawings:—

Figure 1:
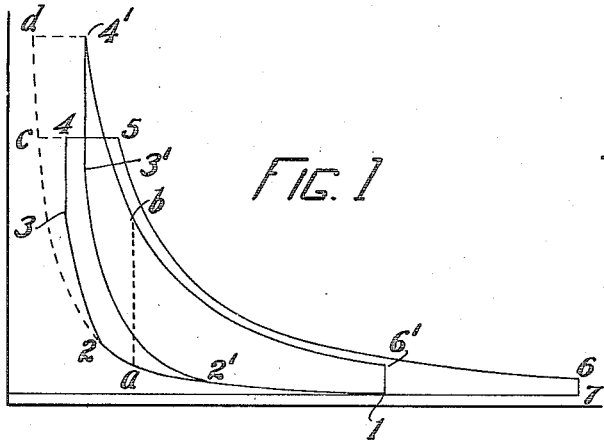
Figure 1 is a diagram illustrating two forms which the thermo-dynamic cycle theoretically may take, and showing other theoretical forms for comparison.

Certain aspects of the invention, and differences from previously known processes are shown graphically in Fig. 1 of the drawings, where the full lines 1—2—3—4—5—6—7—1 indicate the theoretical cycle of pressure and volume changes in a heat engine in which the process of the invention is being carried out. In an indicator card taken from an actual performance of the cycle, the lines would be modified somewhat, by rounding of corners and by other variations, as is well understood; but the process will be best explained by ignoring such departures from the ideal. In the process a confined body of the working medium is compressed by mechanical means, starting at or near atmospheric pressure. As the volume is reduced, the pressure rises along an adiabatic line from 1 until a point 2 is reached where a definite addition of heat begins. Beyond that, heat is added gradually, simultaneously with the continuance of the mechanical compression, so that the pressure of contents rises along the line 2—3—4. The body of gases thus compressed is, or may be, partially composed of products of the combustion which occurred in the last preceding cycle, but the predominating portion is pure air more or less completely separated from said products of combustion; and the heat added is the product of the combustion of a small amount of fresh fuel which is introduced gradually into a sufficient quantity of air to support its combustion, the rate being controlled by suitable means. The continuation of the line 1—2 as it is dotted up to the point c shows the adiabatic line of compression which would be followed if the heat of combustion above mentioned were not added. The full line from 2 to 3 which represents the actual result, is the adiabatic line modified by the gradual addition of a small amount of heat; and the line from 3 to 4 indicates the increase of pressure resulting from the continued addition of heat by combustion while the engine crank is passing over its inner dead center. The point to which this raises the pressure may, for example, be 400 pounds per square inch. The distance from the point 4 to the adjacent vertical axis indicates the clearance space; and it is to be noted that this clearance is approximately double what the clearance would be if the same pressure had been obtained by simple adiabatic compression, as shown by the dotted line. The line 4—5 represents the main addition of heat, by gradual introduction of fuel into the air, and its combustion at constant pressure, as long as may be desired. From 5 to 6 is the expansion line, adiabatic, after which confinement of the contents ends. The pressure falls, ordinarily to atmospheric, upon the opening of an exhaust valve, and the spent gases escape more or less completely, depending on the type of engine in which the process is being carried out; fresh air is drawn in or forced in as the case may be; and the cycle may be repeated.

Another typical form of cycle in which this process may be carried out is shown in Fig. 1, by the solid lines 1, 2', 3', 4', 6', 1. Here as illustrated, addition of heat by combustion begins in the middle portion of the compression stroke and continues gradually until the point 3' is reached; the remaining heat of the cycle is added by combustion at constant volume; then adiabatic expansion occurs, from 4' to 6', followed by exhaust, as before. The process may be successfully carried out in numerous variations or combinations of the typical theoretical cycles illustrated, some of which are hereinafter more fully discussed.

In what I consider the best form of the invention, that in which it is adapted for consumption of the less volatile or so-called "heavy" liquid fuels, a certain stratification of the confined gases is effected as a step preliminary to the combustion. This is effected by providing a column of gases divided more or less perfectly into successive zones. These zones are produced and maintained during the period of combustion by the utilization of relative motion between the point of fuel introduction and the column of air which is to support its combustion. The process is the same whether the column of air is displaced past the point of fuel introduction or whether the point of fuel introduction is displaced from one end of the air to the other during the period of said fuel introduction. Such a column may be composed of remnant products of combustion at one end and of air freshly compressed by any suitable mechanical means at the other end, and fuel should be introduced directly without passing said air through any intermediate receiver or other device by which its heat of compression might be lost. In the zone at the end of this column the combustion is occurring, adding heat and thus setting up pressure which holds back or retards the advance of the column according to the rate at which such combustion is occurring. Next is a zone where the temperature is lower, not high enough for ignition, yet high enough to convert the liquid particles quickly into gaseous form. Next is a zone where liquid particles are being throughly mixed with air preparatory to vaporization and combustion. The said particles are very small, such as may be produced by an "atomizing" or spraying of liquid fuel, and are throughly distributed because of their being forcibly thrown into different parts of the very body of pure air which is to support their combustion, the rate of flow, or quantity of air and of fuel brought into intimate proximity to each other, being proportioned so as to provide sufficient air to make the combustion of each particle complete with the air in its immediate vicinity. The relative movement of the air past the place of fuel injection and of the fuel particles through the column of air, contribute to the thoroughness of distribution. Beyond this is a zone where the pure air, freshly compressed and retaining its heat of compression, is next to pass through the successive various stages just described.

The liquid fuel is introduced into a zone where it mixes very thoroughly with the air, but in what I regard as the best form of the process, it does not there burn but merely becomes volatilized. It then moves forward to the place where it burns, leaving place for subsequently entering fuel and air. The locality of volatilization of each particle of liquid being thus separated from the locality of its combustion, the combustion becomes rapidly complete whenever it occurs, owing to the fuel being in gaseous form and being thoroughly mixed with air so that each molecule thereof finds air for its combustion immediately at hand. In this respect the process differs from the process which is carried out in typical forms of Diesel engines, in which liquid fuel is thrown promiscuously into a stationary body of air whose temperature is sufficient to cause immediate ignition, with the result that the completion of combustion is always delayed, and for the less volatile oils is at best, incomplete. This happens supposedly because when the exterior of each liquid particle has burned, its remaining interior is surrounded by the products of combustion of that exterior and is not in immediate contact with the air which is needed for burning it. It may find the needed air in some other part of the engine cylinder, before the stroke of the engine is completed; but in the meantime it may undergo decomposition from the intense heat, and it may be so much delayed in finding the necesary air that the heat resulting from its combustion is not added until the top of the cycle has been passed, with a resulting loss in efficiency; and with the less volatile oils results in the deposit of carbon on the cooler parts of the engine walls as a result of incomplete combustion.

Figure 4:
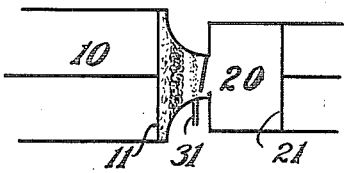
Figs. 2, 3 and 4 are diagrams illustrating different modifications of one general type of engine in which the process can be carried out.
Figure 2:
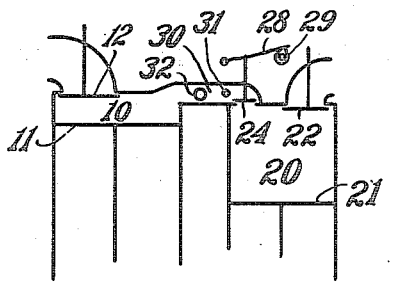
Figure 3:
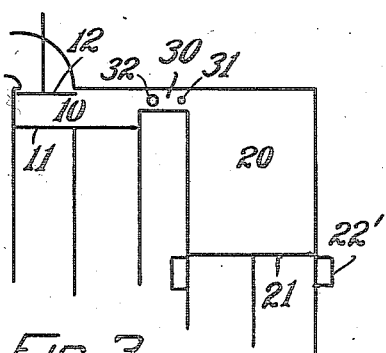

Another feature is that although the column of air may be compressed and moved by a mechanical means, outside of the power cylinder, such as a piston in another cylinder, the main body of air which supports the combustion of each charge is moved forward directly into that portion of the confined space where it does its work without passing through a storage tank, receiver or any other reservoir which is maintained constantly under high pressure. Practically all of the heat of compression is present in the air, to aid in the progressive stratification by preliminarily volatilizing the liquid fuel, and to be conserved as it would otherwise go to waste if there were an intermediate receiver or other storage device from which the air were supplied to the power cylinder. For carrying out the process in this manner, I prefer to employ apparatus having two cylinders, one being a power cylinder, and the other an air compressing cylinder, with a short, direct passage joining them. Such an arrangement is indicated in Figs. 2, 3 and 4. As shown in Fig. 2 I use a valve 24 as a means participating in the control of graduation of the rate of flow of air for supporting the combustion; and this valve may be either a simple check valve opening freely, or it may be a valve whose degree of opening at any specific instant is limited by suitable mechanical means, as indicated by the cam 29. In such apparatus the power cylinder is marked 10, the power piston 11, the air cylinder 20, its piston 21, the passage connecting the two 30, and the valve controlling the entrance to this passage 24. It is also necessary in such apparatus to provide means for letting air into the cylinder 20 and for letting the expanded products of combustion out of the cylinder 10; and in the present case these parts are represented respectively by the air inlet valve 22 and the exhaust valve 12. The two pistons are assumed to be connected with each other (through mechanism readily understood although not shown, as for example, by attaching both pistons to the same crank shaft) so that the power piston leads the air piston about 45°. As a result, when the power piston reaches a position about 40° from the end of its inward stroke, at which point the exhaust valve may be assumed to close, the air piston is in the middle portion of its compressing stroke. The intermediate valve 24 being then opened slightly permits a predetermined flow of air into the passage 30. As the cycle proceeds, air flows through this valve at whatever rate is determined by the relations existing between the pressure in the cylinder 20, (depending on mechanical movement of the piston 21) the pressure in the power cylinder 10 and passages 30 (depending on mechanical movement of the piston 11 and the heat added by combustion), and the degree of opening of the valve 24. Coöperating with this is mechanism for introducing liquid fuel at any predetermined rate, as through the nozzle 31. By such control means a moderate amount of fuel and air may be mixed together, moved through the passage 30, and burned in the part thereof which is near the combustion chamber during that part of the cycle represented by the line 2—3—4 of Fig. 1, thus adding a predeterminate quantity of heat between points 2 and 4, and doing it at a predeterminate rate, followed by the addition of the main quantity of heat along the line 4—5 at a predeterminate rate. Owing to the gradual characteristic of the introduction of the fuel, and the fact that the power cylinder and passage 30 never contain any considerable amount of air, it appears that no unexpected explosion can possibly occur, because there is never more than a little fuel and air mixed together at one time; but in the abnormal case which may be imagined, when a leakage of fuel or some other unforeseen event has led to unexpected explosion, that explosion will be harmless compared with the happening of a similar explosion in an engine of Diesel or semi-Diesel type because, as appears from the diagram, the clearance at the moment of maximum pressure is under the present process double what it would be if the maximum pressure had been obtained by adiabatic compression.

It is not necessary to use the apparatus shown in Fig. 2. For example, the control means for the valve 24 may be omitted, (see Fig. 4) leaving the control of this valve to depend upon the weight of the valve and the balance of pressures between the cylinder 20 where the mechanically moving piston 21 acts, and the passage 30, where the early combustion is setting up pressure. Or, the valve 24 may be omitted entirely as in the diagram of Fig. 3. Or, the cylinder 20 may be omitted, as in the diagrams, Figs. 5, 6 and 7, which show a power cylinder and cul-de-sac combustion chamber.

In the apparatus illustrated in Fig. 3 there is a power cylinder 10, an air cylinder 20 and a passage 30 connecting them into which liquid fuel may be injected and atomized at a predeterminate rate through a nozzle 31. The power and air pistons are marked 11 and 21 as before. Air is admitted through ports 22' uncovered by the air piston 21, and the products of combustion are exhausted through the valve 12 which may be mechanically controlled. It may be assumed that the pistons 11 and 21 are connected to the same crank shaft with the power piston 60° in the lead. Contrary to ordinary practice the exhaust valve may be best opened at or a little beyond the outer dead center of the power piston, for example, 5° or 10° beyond it. The air ports 22' are reached and opened when the air piston is 40° from its outer dead center (this being 15° or 10° respectively later than the said opening of the exhaust) and are closed on the in stroke 40° beyond the dead center of the air piston. During the succeeding 10° of angular travel both pistons are then forcing out exhaust gases, which escape by the exhaust valve 12. After the exhaust valve closes, for example, at 60° from the inner dead center of the power piston, compression of contents proceeds by the mechanical action of both of the inward traveling pistons until the power piston is about 10° from its inner dead center and the air piston about 70° from its inner dead center, at which time combustion of fuel begins and continues at a moderate rate. This combustion is brought about by a suitably timed injection of liquid fuel through the nozzle 31, into the column of air which has about that time begun positively to flow past the fuel nozzle toward the power cylinder. Ignition is accomplished by any suitable means 32, which may, for example, be a hot tube, or a hot wall of the chamber, or an electrical ignition device.

This combustion adds heat, increasing the pressure at the head of the column of air, while pressure is being applied at the other end of the column by mechanical means, viz., the moving piston 21. The combustion continues, gradually raising the pressure until the power piston has passed its dead center and is traveling outward, after which combustion continues practically at constant pressure until the air piston reaches its inner dead center, after which expansion begins in both cylinders and continues until the exhaust valve opens at the completion of the cycle. It will be understood that this is an illustrative example and that variations may be made. With the exhaust closure occurring at the time indicated, 60° from the power piston's inner dead center, the power cylinder might not be completely scavenged but it would be more completely scavenged than is the practice in ordinary four stroke cycle engines which are commonly considered satisfactory. The exhaust valve might be closed 20° later (*i. e.*, 40° from the inner dead center). This would insure practically perfect scavenging and would increase the efficiency of the engine, owing to the increased ratio of expansion, but would decrease the capacity of the engine. A designer may choose some point in this region according to the purposes he wishes to attain. It is my belief that for many purposes the best point for exhaust closure would be at about 50° before the power piston reaches its inner dead center, owing to the fact that the pressure within is about two pounds above atmosphere instead of two pounds below atmosphere as in the four stroke cycle engine. The indicator card representing the relations of pressure and volume in this case would be of the same general characteristic as that discussed above.

Figure 5:
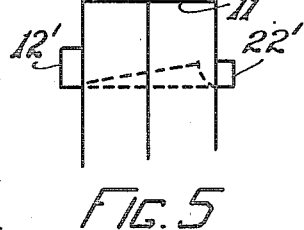

The diagram, in Fig. 5, illustrates a two-stroke cycle engine having only one cylinder, in which the piston at its outer end of stroke uncovers the exhaust port 12' and the air port 22'. The cylinder within becomes filled with freshly admitted air, more or less mixed with remnants of the last combustion, as in ordinary two-stroke cycle engines; and that air is compressed by the inward stroke of the piston 11. At a predetermined place in the stroke, injection of atomized liquid fuel begins through the nozzle 31 at a predeterminate low rate; and a combustion ensues. At this instant the cul-de-sac 30', opening from the head end of the cylinder has received some fresh air, forced into it by the general rise of pressure, so that the fuel injected at its mouth enters combustion-supporting air even though the interior of the cul-de-sac may not have been adequately scavenged. Continued diminution of volume by movement of the piston is accompanied by continued injection and combustion of fuel at the mouth of the cul-de-sac, with the result that the addition of heat locally in the cul-de-sac sets up a pressure of contents thereof which opposes the movement of air into the cul-de-sac which would otherwise take place with the increase of pressure caused by advance of the piston 11, and keeps the main body of pure air out in the main part of the cylinder 10 until near the end of stroke. The concluding part of the piston's stroke, forces practically all of this air into the cul-de-sac or drives it past the fuel nozzle 31, each part of the air receiving a proportionate quantity of fuel which becomes first volatilized and then burned. Thus for this type of engine a far superior distribution of fuel, through its needed air, is brought about by the gradual movement of the main body of air which is to support combustion past the place where the fuel is gradually entering during the period of combustion. The process in this case is represented in the diagram, Fig. 1, by the line 1—2'—3'—4'—6'—1. From 1 to 2' compression of air is proceeding adiabatically; from 2' to 3' the mechanical compression is proceeding simultaneously with the addition of heat; and the line from 3' to 4' represents the passage of the piston over the dead center with the accompanying rise of pressure due to the continued combustion. This combustion is assumed to be complete at the point 4' from which the expansion line extends adiabatically to 6' where the pressure falls by the exhaust to 1 ready for the beginning of a fresh cycle.

For carrying out this form of cycle, it may be preferable for all except small sizes of engines to supplement the displacement of the air into the cul-de-sac by a simultaneous displacement of the point of fuel introduction in the opposite direction. This permits the addition of heat by combustion to begin somewhat later during the compression stroke and thus increases the theoretical efficiency of this type of engine still further as well as insuring progressive stratification and all the other advantages of this process.

Figure 6:
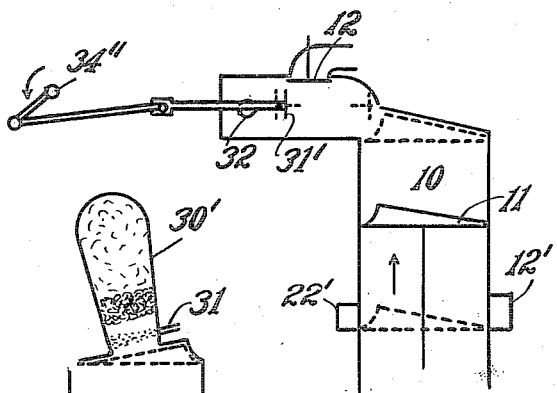
Figs. 5, 6 and 7 are diagrams illustrating different modifications of another general type of engine in which the process can be carried out.
Figure 7:
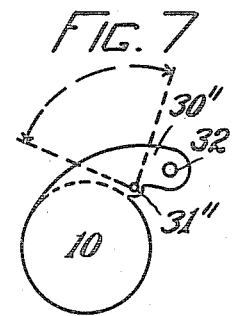

Figs. 6 and 7 illustrate by diagram two methods of obtaining such relative displacement of an oil nozzle or other fuel distributing element. On Fig. 6, 31' represents such a nozzle mounted on the end of a reciprocating hollow rod or plunger which by means of the crank and connecting rod is moved to and fro in the cul-de-sac between the dotted line positions. By the use of properly ground or packed bearings, the oil or other fuel may enter through an axial hole in the shaft 34", pass through the hollow crank and connecting rod and plunger, and so reach the nozzle 31'. The shaft 34" may rotate at a speed equal to twice that of the engine shaft, and with the cranks set at the angle with each other, indicated in the diagram, the travel of the oil nozzle will be relatively great as compared with that of the piston when near its inner end of stroke. The fuel should be introduced at a rate proportional to the amount of air in immediate proximity to the point of its introduction, and in sufficiently small proportion thereto so that there is abundance of air closely at hand to complete the combustion of each particle of fuel when once started. To obtain more complete scavenging than is possible with both air and exhaust ports controlled by the piston, a scavenging valve may be placed in some such relative position as is indicated in Fig. 6, at 12.

Fig. 7 illustrates a cul-de-sac extending on a somewhat circular line around an oil nozzle 31″ or other fuel distributing element, which may be rotated on an axis or vibrated in any suitable manner so that during the period of fuel injection the direction of the fuel spray is changed progressively, as for example, from the direction of one of the dotted lines in that figure to that of the other. This gives practically the same result with a simpler mechanism.

For comparison with a low pressure engine the line $a$, $b$, Fig. 1, may be used. In such engines as heretofore operated, the fuel is injected and mixed with the air during the compression stroke and heat is added at constant volume as on the line from $a$ to $b$, the line $b$—$6'$ representing expansion. To prevent pre-ignition such an engine must have a large clearance space, as indicated by the distance of the line $a$—$b$ from the vertical axis. If the process of the invention be used the clearance may be reduced, because, the fuel being introduced gradually, no great quantity of fuel is ever normally present unburned at any one time. With this goes increase in maximum pressure, resulting in both greater efficiency and greater capacity.

Thus the process of the invention permits an engine to be designed with great modifications of the clearance space as compared with present types of engines. In "high pressure" engines the clearance may be increased, without materially affecting the efficiency, yet enormously reducing the magnitude of abnormal pressure which the engine must be designed to resist due to danger of such pressure happening from fuel leakage or other abnormal cause. In "low pressure" engines the clearance may be designed smaller, as above explained. And in both cases the process insures more perfect combustion of the cheaper and less volatile oils, with all the commercial and sanitary advantages that follow.

In low or medium pressure engines of the type shown in Figs. 5, 6 and 7, the clearance space or combustion chamber is practically separate from the cylinder proper, but has communication therewith through a continuously open passage. Fuel, introduced with a trajectory which crosses this passage, is there volatilized as it enters; and its combustion occurs subsequently as the combustible mixture thus made enters the combustion chamber. Thus pressure is set up within that portion of the chamber lying beyond the point of fuel introduction, and that pressure retards the entrance of the main body of air which is being displaced by the compression stroke of the piston. However, in the latter part of this stroke, practically the whole quantity of air has to leave the cylinder 10. In the form of Fig. 5 it can then receive its main fuel charge while passing the point of fuel introduction. In the forms of Figs. 6 and 7 it may receive its fuel charge later.

In carrying out the process with the aid of mechanical appliances, I find a tendency of fuel to cling by skin tension to the nozzle or other means through which it is injected, so that the latter part of each injected charge has no trajectory through the air, but hangs as a residual drop. In the best form of the process, and for obtaining the highest efficiency, it is necessary that this be avoided and that the skin tension of the last fuel to be introduced to be overcome so far as to separate it from the wall of the nozzle and to break it up finely for distribution through the air and volatilization therein. One means of doing this is shown in my co-pending application for patent hereinbefore mentioned, as referring to a fuel injection nozzle, wherein the stream is so concentrated that its momentum overcomes the skin tension. The volatilization is preferably controlled by the temperature of the air into which the atomized fuel is injected. A temperature sufficient for the volatilization is obtainable by the mechanical compression of the air. As a temperature sufficient for ignition is obtainable by the same means, as is customary in engines of the Diesel type, it is important when this feature of the invention is used, to see that the temperature into which the atomized fuel is thrown is suitably controlled and regulated, so that it will not rise to the ignition point of the fuel. This may be done by taking account of the temperature of compression of the air, and of the walls of the region. When combustion has once been started the flame will propagate itself backward as far as the fuel is in volatilized condition. The zone of combustion may approach so close to the place where the particles are becoming volatile, that the distance separating the two may be almost infinitesimal. Hence there is no chance for the condensation which is a chief objection to certain types of explosive engines operating on oil at low pressure.

In cases where the combustion chamber takes the form of a passage joining two cylinders that passage should be of ample size so as not to restrict flow of gaseous contents appreciably nor to increase materially the pressure of the air which is being displaced toward the place of combustion. Where a valve is used there may be a substantial difference of pressure between the two cylinders, depending upon the time and degree of the valve's opening, but at the top of each cycle this valve should be open wide enough to prevent any considerable difference. The line 1—4 for the theoretical diagram of Fig.

1 takes account of this, in the manner well understood in engineering practice, so that the line represents the composite effect in the whole space.

In addition to the advantages above specified the process permits an engine which is performing the process to be operated at a considerable overload by the simple method of taking the air initially at a pressure somewhat above atmosphere. In that case the cylinder 20, containing, say, half again as much air at seven pounds pressure initially, which can easily be provided by a rotary blower, is capable of burning half again as much fuel, and thus can turn out 50% overload of dynamic energy. For ordinary combustion the air cylinder 20 may be made of smaller diameter than the power cylinder, in which case the ratio of expansion of the products of combustion in the power cylinder is greater than the ratio of compression, producing greater efficiency. As a general proposition the addition of heat to a working medium during its compression, before the top of the cycle, ordinarily results in loss of efficiency. I have discovered, however, that this theoretical loss is in practice so much overbalanced by gains that are made available by the process that it may be neglected as a matter of practical consideration; and indeed that the gains are probably greater than the losses. By submitting to this theoretical loss, whatever it may amount to, the enormous advantages of safety, of increased power capacity per unit of weight of engine, and of cheapness of construction are attained, together with relatively more complete and quick, and therefore more efficient, combustion, combined with the ability to burn completely the less volatile and cheaper liquid fuels.

I claim as my invention:

1. A process of combustion and thermodynamic conversion within an engine comprising the confinement within a limited space of a gaseous working medium consisting in part of products of combustion and in part of fresh air, which is the main body of air that is to support combustion; these occupying different portions of the space; compression of said confined contents by a mechanically moving part, reducing the volume and tending to move a column of said confined air toward said products of combustion; the gradual introduction of liquid fuel directly into said air while being so moved past the point of fuel introduction, and the gradual combustion of said fuel at the head of said column of air setting up a back pressure retarding the movement of said air past the place where said fuel is introduced; followed by expansion of the products of combustion against a power transmitting element.

2. A process of combustion and thermodynamic conversion within an engine including the simultaneous confinement of a body of air, compression of the whole body by mechanical reduction of volume of the space wherein it is confined, movement of it through a definite course gradually, and introduction of liquid fuel gradually into said air, the rate of fuel inflow being graduated according to the amount of air to whose immediate proximity it is introduced, so that sufficient air for complete combustion of the introduced fuel is in immediate proximity thereto; volatilization of said liquid upon its said introduction; combustion of said volatilized fuel in its said air at a locality farther along in the course of movement thereof and continuing simultaneously with the continuance of introduction of the main body of fuel; and expansion of the products of combustion against a power transmitting element.

3. A process of combustion and thermodynamic conversion within an engine including the simultaneous confinement of a body of air, compression of the whole body by mechanical reduction of volume of the space wherein it is confined, movement of it through a definite course gradually and introduction of liquid fuel gradually into a part of said air which still retains heat from its said compression and is of sufficient temperature to volatilize but not to ignite said liquid upon its said introduction; the rate of fuel inflow being graduated according to the amount of air to whose immediate proximity it is introduced, so that sufficient air for complete combustion of the introduced fuel is in immediate proximity thereto; combustion of said volatilized fuel in said air at a locality farther along in the course of movement thereof and continuing simultaneously with the continuance of introduction of the main body of fuel; and expansion of the products of combustion against a power transmitting element.

4. A process of combustion and thermodynamic conversion within an engine including the confinement of a quantity of gas stratified in zones, one of which zones consists of air located near a moving wall of the confining means and undergoing compression and displacement thereby; another zone, of air more remote from said wall but still affected thereby, into which zone injection of liquid fuel is simultaneously proceeding and in which zone said fuel is mixed with and volatilized in the main body of air which is to support its combustion; another zone in which combustion of fuel is in progress supported by the air with which it was mixed in the preceding zone; and another zone in which are the products of combustion; the said air moving progressively forward through said zones whereby a gaseous combustible mixture constituting the source of power is made progressively under confinement and pressure, and is burned in a separate but closely adjacent zone.

5. A process of combustion and thermodynamic conversion within an engine comprising the repeated execution of a cycle, in one period of which confined gases are stratified in zones including a zone of air, a zone of mixed air and fuel in which liquid fuel is being vaporized and a zone of products of combustion; the said air moving progressively from its zone toward the others during the combustion; the said mixture being effected by spraying liquid into the moving air as it passes; and the quantity of passing air being so proportioned to the rate of injection of fuel that the passing air is adequate for the complete combustion of the fuel that is injected into it; said gases when so confined being within a space, in substantially all parts of which the pressure varies through a wide range during each cycle.

6. A process of combustion and thermodynamic conversion within an engine, comprising the repeated execution of a cycle including the reduction of volume and consequent compression of a body of air which is to support the combustion for a complete cycle thereby generating heat sufficient to volatilize but not to ignite the liquid fuel which is in use, and the immediate displacement of said main body of air past a certain point, and the simultaneous introduction of said liquid fuel at said point in the form of a spray, at a rate such that the quantity of fuel entering is approximately proportional to the quantity of air immediately in the path of said spray; and wherein the combustion of the main portion of the fuel occurs progressively and occurs farther along in the course of the said displacement of air and while the introduction of fuel is continuing.

7. A process of combustion and thermodynamic conversion within an engine working on a cycle including the compression of air by the reduction of its volume thereby generating heat, and the immediate addition of heat by combustion of fuel, and subsequent expansion; wherein difficultly volatilizable oil fuel is thrown into the body of compressed air and distributed from one extremity to the other thereof progressively and with penetrating trajectory in the form of finely divided liquid particles, the rate of said fuel introduction being such that the quantity of fuel entering is approximately proportional to the quantity of air immediately in the path of said trajectory; and wherein the combustion of the main portion of the charge of fuel for any particular cycle is progressive and occurs while the introduction of fuel is continuing.

8. A process of combustion and thermodynamic conversion within an engine of difficultly volatilizable fuel comprising the gradual distribution of said fuel in atomized form with penetrating trajectory from one extremity to the other of a body of air maintained at a temperature sufficient to volatilize said fuel but not to ignite it and sufficient in quantity to burn completely the fuel thus distributed through it; ignition occurring in proximity to that extremity where fuel is first introduced in such manner as to start combustion soon after the initial injection of fuel; the said combustion continuing during the injection of the remaining fuel, and the said deferring of combustion being obtained by controlling the temperature of the air into which the fuel is introduced.

9. A process of combustion and thermodynamic conversion within an engine comprising the repeated execution within a confined space of a cycle including a period of continuous and progressive stratification of the gaseous contents of said confined space during combustion of fuel therein with simultaneous introduction of additional fuel in sprayed liquid form; the stratification being effected by displacement of the part of the contents which is to support the main combustion to the place of introduction of said fuel simultaneously with such introduction; and the pressure in substantially all parts of said space varying through approximately the entire pressure range of the said cycle.

10. A process of combustion and thermodynamic conversion within an engine comprising the repeated execution within a confined space of a cycle including a period of continuous and progressive stratification of the gaseous contents of said confined space during combustion of fuel therein with simultaneous introduction of additional fuel in sprayed liquid form; the stratification being effected by displacement of the said fuel and the portion of said contents which is to support the main combustion of the fuel relative to each other during the said introduction of fuel; and the pressure in substantially all parts of said space varying through approximately the entire pressure range of the said cycle.

11. A process of combustion and thermodynamic conversion within an engine consisting in throwing liquid fuel in atomized form with a penetrating trajectory into a confined space; the displacement of the main body of air supporting combustion by mechanical means through a course intersecting the trajectory of said fuel; the beginning and continuance of combustion, during said period of displacement, at the head of the column of air that is being displaced, and, by the heat thus generated, setting up a pressure which controls the rate of advance of the column of air during said period of displacement, whereby the distribution of fuel throughout the air is retarded and regulated; said progressive introduction of fuel and distribution thereof being accompanied by progressive combustion.

12. A process of combustion and thermodynamic conversion within an engine consisting in throwing liquid fuel in atomized form with a penetrating trajectory into a confined space; the displacement of a main body of air supporting combustion by mechanical means through a course intersecting the trajectory of said fuel; the beginning and continuance of combustion, during said period of displacement, at the head of the column of air that is being displaced, and, by the heat thus generated, setting up a pressure which tends to retard the rate of advance of the column of air during said period of displacement, the said rate of advance being further retarded by a throttling action; said progressive introduction of fuel and distribution thereof being accompanied by progressive combustion.

Signed by me at Boston, Mass., this 15th day of February, 1915.

MERL R. WOLFARD.

Witnesses:
JOSEPH T. BRENNAN,
EVERETT E. KENT.